(12) United States Patent
Yu et al.

(10) Patent No.: US 8,359,133 B2
(45) Date of Patent: Jan. 22, 2013

(54) ENGINE POWER ELEVATION AND ACTIVE BATTERY CHARGE ENERGY MANAGEMENT STRATEGIES FOR PLUG-IN HYBRID ELECTRIC VEHICLES

(75) Inventors: Hai Yu, Canton, MI (US); Ming Lang Kuang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 13/029,445

(22) Filed: Feb. 17, 2011

(65) Prior Publication Data

US 2011/0172867 A1 Jul. 14, 2011

Related U.S. Application Data

(60) Provisional application No. 61/338,495, filed on Feb. 19, 2010.

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |

(52) U.S. Cl. .......................................... 701/22
(58) Field of Classification Search ................ 701/22
See application file for complete search history.

(56) References Cited

U.S. PATENT DOCUMENTS

| | | | |
|---|---|---|---|
| 5,495,912 A | 3/1996 | Gray, Jr. et al. | |
| 6,258,001 B1 * | 7/2001 | Wakuta et al. ............... | 475/5 |
| 6,338,391 B1 * | 1/2002 | Severinsky et al. ......... | 180/65.23 |
| 6,646,419 B1 * | 11/2003 | Ying .............................. | 320/132 |
| 6,994,360 B2 | 2/2006 | Kuang et al. | |
| 7,104,347 B2 | 9/2006 | Severinsky et al. | |
| 7,398,147 B2 | 7/2008 | Kozarekar et al. | |
| 2001/0039230 A1 | 11/2001 | Severinsky et al. | |
| 2003/0076071 A1 * | 4/2003 | Kanno ........................... | 320/132 |
| 2003/0162631 A1 * | 8/2003 | Williams ....................... | 477/5 |
| 2004/0117078 A1 * | 6/2004 | Corcione et al. ............ | 701/22 |
| 2009/0065276 A1 * | 3/2009 | Birke et al. ................ | 180/65.275 |
| 2009/0150015 A1 | 6/2009 | Okubo et al. | |
| 2009/0224623 A1 | 9/2009 | Saito et al. | |
| 2010/0082192 A1 | 4/2010 | Hofbauer | |
| 2011/0111905 A1 * | 5/2011 | Tiwari et al. ................ | 475/2 |
| 2011/0190968 A1 * | 8/2011 | Fleming et al. ............. | 701/22 |
| 2011/0288769 A1 * | 11/2011 | Gudat et al. ................ | 701/208 |

* cited by examiner

*Primary Examiner* — Khoi Tran
*Assistant Examiner* — Nicholas Kiswanto
(74) *Attorney, Agent, or Firm* — David B. Kelley; Brooks Kushman P.C.

(57) ABSTRACT

A method for a plug-in hybrid electric vehicle (PHEV) having an engine and a battery configured to respectively deliver engine power and battery power to provide a total output power for powering the vehicle includes the following. An elevated engine power which falls within a total output power range where only engine power without battery power may be delivered to power the vehicle in response to a driver demand power and which is greater than the combination of the driver demand power and vehicle powering losses is determined. The engine delivers the elevated engine power in response to the driver demand power. The extra engine power is transferred to the battery for the battery to buffer.

17 Claims, 8 Drawing Sheets

ENGINE POWER ELEVATION AND ACTIVE BATTERY CHARGE ENERGY MANAGEMENT STRATEGIES FOR PLUG-IN HYBRID ELECTRIC VEHICLES

CROSS-REFERENCE TO RELATED APPLICATIONS

This application claims the benefit of U.S. Provisional Application No. 61/338,495, filed Feb. 19, 2010; which is incorporated by reference in its entirety.

TECHNICAL FIELD

The present invention relates to a plug-in hybrid electric vehicle (PHEV) and a method of control.

BACKGROUND

A plug-in hybrid electric vehicle (PHEV) and a hybrid electric vehicle (HEV) each have an engine and at least one electric motor, wherein the energy source for the engine is fuel and the energy source for the motor is an electric battery. The PHEV battery has a larger capacity and is primarily rechargeable from an external electric grid. The battery may be charged by the engine using fuel stored in the vehicle.

PHEVs and HEVs buffer fuel energy and recover kinematic energy in electric form to improve the overall operating efficiency. For HEVs, fuel is the principal energy source. For PHEVs, there is an additional source of energy—the amount of electric energy stored in the battery from the grid after each battery charge event. The larger and re-chargeable PHEV battery enables higher capability of fuel energy buffering and kinematic energy recovering and a plug-in recharging ability to thereby improve the fuel economy in both a fuel/electric blended driving mode and an electric driving mode.

HEVs are typically operated to maintain a battery state of charge (SOC) around a constant charge level. In contrast, PHEVs use as much pre-saved battery energy as possible before the next battery charge event; i.e. the relatively low cost grid supplied electric energy is expected to be fully used for propulsion and other vehicle functions after each charge. After the battery SOC decreases to a predefined low level during a given driving event, the PHEV resumes operation as a HEV in a so-called charge sustaining (CS) mode.

To this end, two basic PHEV operating modes include a charge depleting (CD) mode and the charge sustaining (CS) mode. During a first travel distance after a charge, the fully/partially charged PHEV is driven in CD mode, where primarily the battery is used to propel the vehicle, gradually depleting the battery SOC. Once the battery SOC decreases to the low level, the vehicle switches to CS mode, where the battery SOC is kept within a certain range around the low level and the vehicle is mainly powered by fuel energy as is done in a HEV.

The base CD range is the distance a fully charged PHEV can travel in CD mode before the energy utilization pattern switches to the CS mode. By primarily using the battery to propel the vehicle, the fuel consumption is minimized (blended CD mode). The vehicle may even operate with no fuel cost (all-electric CD mode) when the trip distance is less than the base CD range (e.g., ~30-60 miles). The battery, which will be depleted to a SOC less than a maximum SOC but greater than the low level, can be recharged using the grid during driving off-time.

Three general classifications for HEV power-trains include: series hybrid electric, parallel hybrid electric, and series-parallel hybrid electric. The series-parallel hybrid electric classification includes the so-called power-split hybrid electric power-train.

In the case of a series HEV, the engine drives a generator, which converts mechanical engine power to electrical power. A portion of the electrical power is used to drive the motor, which converts electrical power back to mechanical power to drive the wheels. The power not needed by the motor is used to charge the battery.

In the case of parallel and series-parallel HEVs, mechanical engine power can be delivered to the wheels, and electric battery power can be delivered to the motor, which converts the electric power to mechanical power to drive the wheels. Power flow from the engine to a generator occurs when the battery is being charged. Transmission gearing forms parallel power flow paths to the wheels.

A misconception about parallel and series-parallel HEVs is that electric-only propulsion improves fuel economy because no fuel is used when the engine is off. However, this is not the case because losses incurred by the motor and the battery during discharging and subsequent battery charging can degrade fuel economy as electric power is converted to mechanical power and mechanical power is converted to electric power. Thus, in parallel and series-parallel HEVs that use an engine and a motor powered by a battery, the guiding energy management strategy principle is to provide as much propulsion as possible with the engine, while selectively using the electrical system to increase the average efficiency of the engine.

A parallel or series-parallel HEV that relies upon an electric grid for charging the battery (i.e., PHEV) changes the assumption that electric-only propulsion is fuel inefficient. This is because as there is an externally available energy source, the best fuel economy is achieved by using it, rather than using the on-board fuel, to propel the vehicle. Therefore, energy management strategies are desired to realize the fuel economy improvements that can be gained by using PHEVs.

SUMMARY

In an embodiment, a method is provided. The method is for a vehicle having an engine and a battery configured to respectively deliver engine power and battery power to provide a total output power for powering the vehicle is provided. The method includes determining an elevated engine power which falls within a total output power range where only engine power without battery power may be delivered to power the vehicle in response to a driver demand power and which is greater than the sum of the magnitudes of the driver demand power and vehicle powering losses. The method further includes controlling the engine to deliver the elevated engine power in response to the driver demand power. The extra power (i.e., the difference in power between (i) the elevated engine power and (ii) the sum of the magnitudes of the driver demand power and the vehicle powering losses) may be buffered into the battery for future use by the battery in powering the vehicle.

In an embodiment, a system is provided. The system is for a vehicle having an engine and a battery configured to respectively deliver engine power and battery power to provide a total output power for powering the vehicle. The system includes a controller configured to determine an elevated engine power which falls within a total output power range where only engine power without battery power may be delivered to power the vehicle in response to a driver demand power and which is greater than the sum of the magnitudes of the driver demand power and vehicle powering losses. The controller is further configured to control the engine to deliver the elevated engine power in response to the driver demand power. Again, the extra power (i.e., the difference in power between (i) the elevated engine power and (ii) the sum of the magnitudes of the driver demand power and the vehicle powering losses) may be buffered into the battery for future use by the battery in powering the vehicle.

In general, according to embodiments of the present invention, the elevated engine power is more than the combination of the driver demand power and vehicle powering losses (e.g., powertrain and/or drivetrain power losses) and the extra engine power generated is buffered in the battery for future propulsion and utility usage. As indicated, the engine power is elevated to a level greater than the combination of the driver demand power and the vehicle powering losses. The extra power from the engine, which is the engine power left over after the driver demand power and the vehicle powering losses have been satisfied, is buffered in the battery by actively charging the battery from the fuel energy. By doing this, even though an instantaneous fuel consumption increase is a result, the engine power efficiency largely increases. By re-applying the buffered energy in the battery to propel the vehicle in the future, the overall operating efficiency in the long run increases and the fuel economy is thus improved.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Energy management strategies in accordance with embodiments of the present invention provide control methods which take advantage of the PHEV large battery capacity to carry out active and aggressive fuel energy buffering such that the fuel energy can be transferred into mechanical work more efficiently in time domain or trip domain redistribution. As a result, the PHEV's overall system energy efficiency and fuel economy can be improved.

Figure 1:
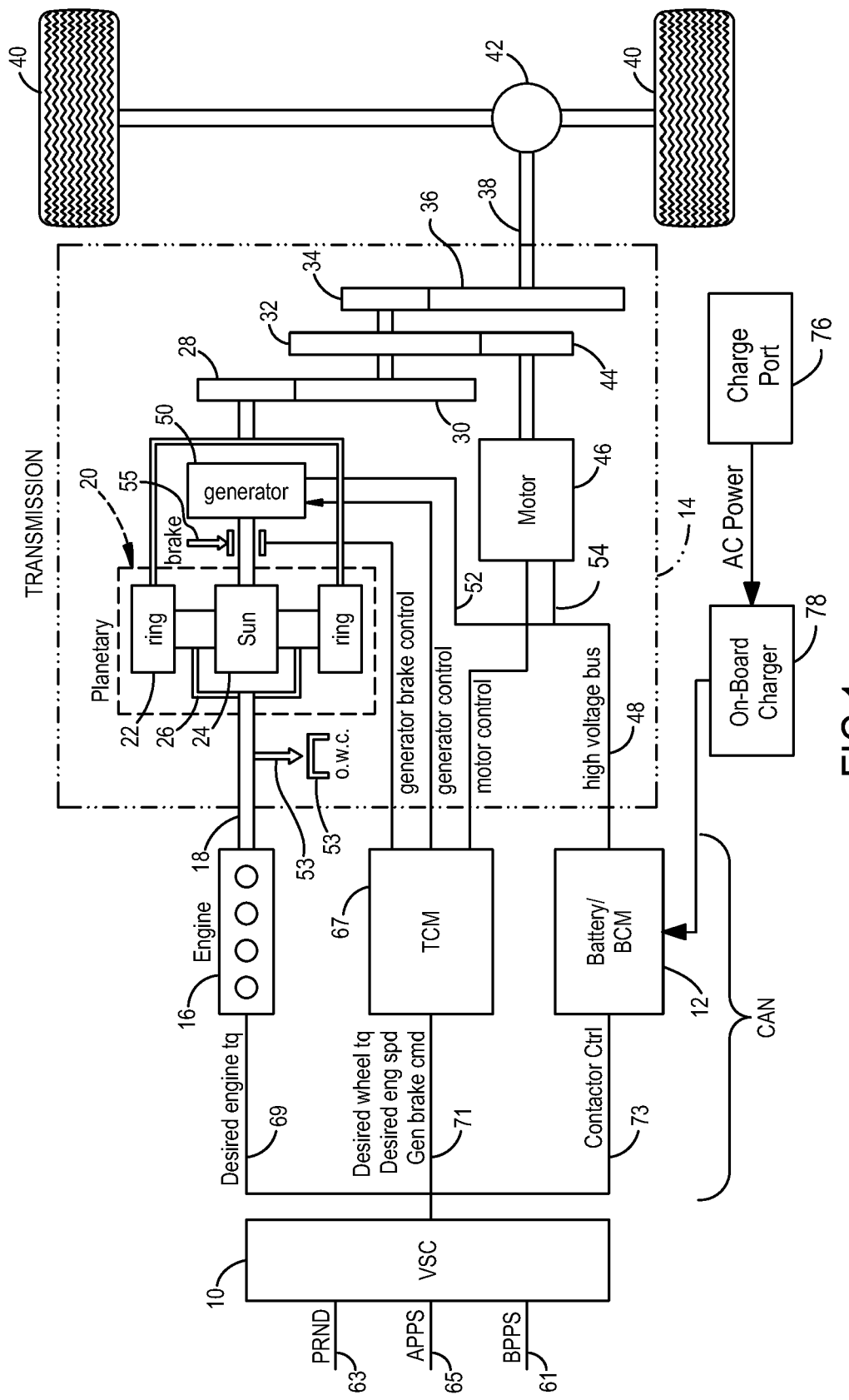
FIG. 1 illustrates a block diagram of a plug-in hybrid electric vehicle (PHEV) power-train capable of operating according to energy management strategies in accordance with embodiments of the present invention.

Referring now to FIG. 1, a block diagram of a plug-in hybrid electric vehicle (PHEV) power-train capable of operating according to energy management strategies in accordance with embodiments of the present invention is shown. This power-train is a power split HEV power-train, in which a planetary arrangement 20 is used and is one example in a class of parallel HEVs. Although the power-train of FIG. 1 will be particularly described, the energy management strategies in accordance with embodiments of the present invention can apply to other configurations. For example, the strategies can apply to a power-train with a single motor/generator.

The power-train of FIG. 1 includes two power sources that are connected to the driveline: 1) an engine 16 and generator subsystems connected to each other via planetary 20, and 2) the electric drive system including a battery 12, an electric motor 46, and a generator 50. Battery 12 is an energy storage system for motor 46 and generator 50.

Battery 12 is rechargeable from a power source residing external the vehicle (e.g., an external electric grid). Battery 12 periodically receives AC electrical energy from the grid via a charge port 76 connected to the grid. An on-board charger 78 receives the AC electrical energy from charge port 76. Charger 78 is an AC/DC converter which converts the received AC electrical energy into DC electrical energy suitable for charging battery 12. In turn, charger 78 supplies the DC electrical energy to battery 12 in order to charge battery 12 during the recharging operation.

A vehicle system controller (VSC) 10, battery 12, and a transmission 14, together with the motor-generator subsystem, comprise a control area network (CAN). Engine 16, controlled by controller 10, distributes torque through torque input shaft 18 to transmission 14.

Transmission 14 includes planetary 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is driveably connected to vehicle traction wheels 40 through a differential-and-axle mechanism 42.

Gears 30, 32, and 34 are mounted on a counter shaft with gear 32 engaging a motor-driven gear 44. Motor 46 drives gear 44, which acts as a torque input for the counter shaft gears 30, 32, 34.

Battery 12 delivers electric power to motor 46 through power flow path 48. Generator 50 is connected electrically to battery 12 and to motor 46, as shown at 52.

While battery 12 is acting as a sole power source with engine 16 off, torque input shaft 18 and carrier assembly 26 are braked by an overrunning coupling (i.e., one-way clutch (OWC)) 53. A mechanical brake 55 anchors the rotor of generator 50 and sun gear 24 when engine 16 is on and the power-train is in a parallel drive mode, sun gear 24 acting as a reaction element.

Controller 10 receives a signal PRND (park, reverse, neutral, drive) from a transmission range selector 63, which is distributed to transmission control module (TCM) 67, together with a desired wheel torque, a desired engine speed, and a generator brake command, as shown at 71. A battery switch 73 is closed after vehicle "key-on" startup. Controller 10 issues a desired engine torque request to engine 16, as shown at 69, which is dependent on accelerator pedal position sensor (APPS) output 65.

A brake pedal position sensor (BPPS) distributes a wheel brake signal to controller 10, as shown at 61. TCM 67 issues a generator brake control signal to generator brake 55 and distributes a generator control signal to generator 50.

Figure 2:
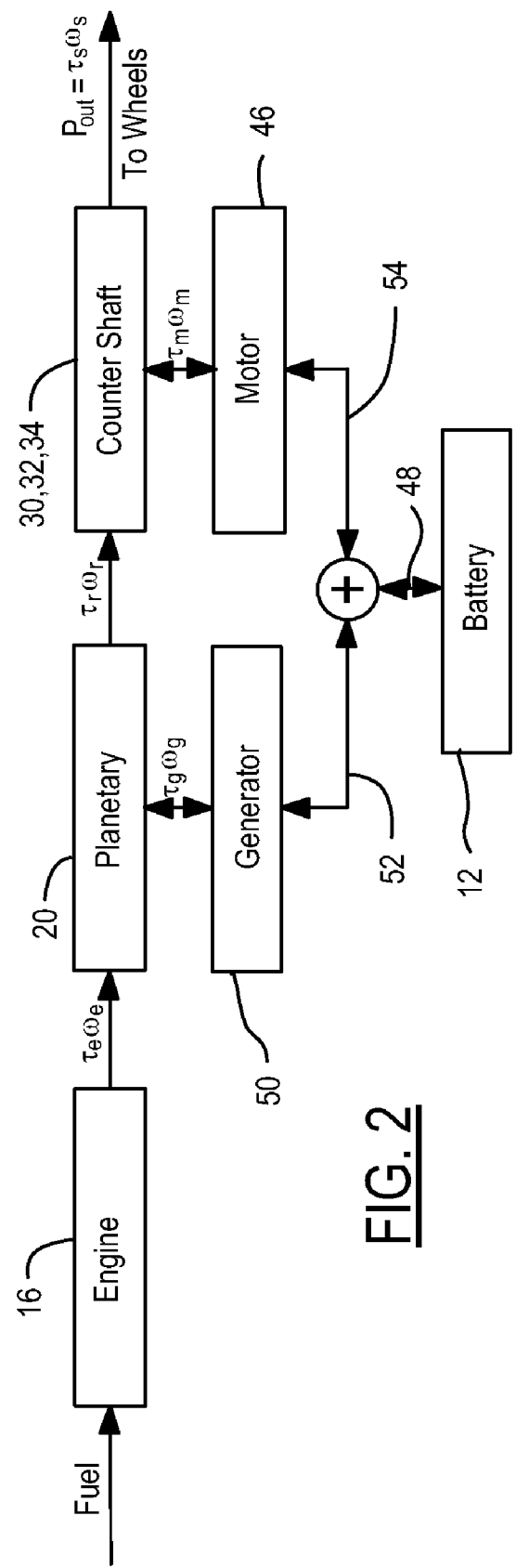
FIG. 2 illustrates a block diagram of the power flow paths for the power-train shown in FIG. 1.

Referring now to FIG. 2, power flow paths for the power-train of FIG. 1 are shown. Fuel is delivered to engine 16 under the control of the driver using an engine throttle. Engine power delivered from engine 16 to planetary arrangement 20 is the product $\tau_e \omega_e$, where $\tau_e$ is engine torque and $\omega_e$ is engine speed. Power delivered from planetary 20 to the counter shaft gears is the product $\tau_r \omega_r$, where $\tau_r$ is the ring gear torque and $\omega_r$ is the ring gear speed. Power out ($P_{out}$) from transmission 14 is the product $\tau_s \omega_s$, where $\tau_s$ and $\omega_s$ are the torque and speed of output shaft 38, respectively.

Generator 50, when acting as a motor, can deliver power to planetary 20. Alternatively, generator 50 can be driven by planetary 20, as represented by power flow path 52. Similarly, power distribution between motor 46 and the counter shaft gears can be distributed in either direction, as shown by power flow path 54. Driving power from battery 12 or charging power to battery 12 is represented by the bi-directional arrow 48.

As shown in FIG. 2, engine output power can be split into two paths by controlling the speed of generator 50. The mechanical power flow path $\tau_r \omega_r$) is from engine 16 to the carrier to the ring gear to the counter shaft. The electrical power flow path $\tau_g \omega_g$ to $\tau_m \omega_m$) is from engine 16 to generator 50 to motor 46 to the counter shaft. The engine power is split, whereby the engine speed is disassociated from the vehicle speed during a so-called positive split mode of operation. In the positive split arrangement, engine 16 delivers power to planetary 20, which delivers power to the counter shaft gears 30, 32, 34, which in turn drive wheels 40. A portion of the planetary gearing power is distributed to generator 50, which delivers charging power to battery 12. The speed of generator 50 is greater than zero or positive, and the generator torque is less than zero. Battery 12 drives motor 46, which distributes power to the counter shaft.

If generator 50, due to the mechanical properties of planetary 20, acts as a power input to planetary 20 to drive the vehicle, the operating mode is referred to as the so-called negative split mode of operation. In the negative split arrangement, both the generator speed and generator torque are negative. In particular, generator 50 delivers power to planetary 20 as motor 46 acts as a generator and battery 12 is charging. Under some conditions motor 46 may distribute power to the counter shaft gearing if the resulting torque at wheels 40 from the gearing does not satisfy the driver demand. Then motor 46 must make up the difference.

If generator brake 55 is activated, a parallel operating mode is established. In the parallel operating configuration, engine 16 is on and generator 50 is braked. Battery 12 powers motor 46, which powers the counter shaft gearing simultaneously with delivery of power from engine 16 to planetary 20 to the counter shaft gearing.

In the power-train of FIG. 1, engine 16 requires either the generator torque resulting from engine speed control or the generator brake torque to transmit its output power through both the electrical and mechanical paths (split modes) or through the all-mechanical path (parallel mode) to the drive-train for forward motion.

During operation with the second power source (previously described as including battery 12, motor 46, and generator 50), motor 46 draws power from battery 12 and provides propulsion independently from engine 16 to the vehicle for forward and reverse motions. This operating mode is called "electric drive." In addition, generator 50 can draw power from battery 12 and drive against one-way clutch 53 coupling on the engine output shaft to propel the vehicle forward. Generator 50 can propel the vehicle forward alone when necessary.

The operation of the power-train of FIG. 1 integrates the two power sources to work together seamlessly to meet the driver's demand without exceeding the system limits (such as battery limits) while optimizing the total power-train system efficiency and performance. Coordination control between the two power sources is needed.

As shown in FIG. 1, the power-train includes controller 10 which performs the coordination control between the two power sources. Under normal conditions, controller 10 interprets the driver demands (e.g., acceleration and deceleration demands), and then determines the wheel torque command based on the driver demand and power-train limits. In addition, controller 10 determines when and how much torque each power source needs to provide in order to meet the driver's torque demand and achieve the operating point (torque and speed) of the engine.

Controller 10 does not issue battery power commands to battery 12. Rather, a target battery power is achieved by creating a difference between the driver demanded power and the engine power available. If the driver demanded power is larger than the power available at the engine, the battery will be discharged. If the driver demanded power is less than the available engine power, the battery will be charged. The energy management strategies in accordance with embodiments of the present invention use the power-train elements to charge and discharge battery 12.

As indicated above, an embodiment of the present invention provides an energy management strategy that takes advantage of the PHEV large battery to carry out active and aggressive fuel energy buffering such that the fuel energy can be transferred into mechanical work in a more efficient manner in time domain or trip domain redistribution.

For a PHEV, the best way to improve fuel economy is to largely utilize the battery (electric energy from grid) for driving the vehicle and to minimize the engine-on operation, especially when the trip distance is not more than the base charge depletion (CD) range. Thus, the first energy management objective is to deplete battery electric energy before the next battery charge event. An energy management strategy for carrying out this first objective is the fast battery charge depletion energy management strategy.

Figure 3:
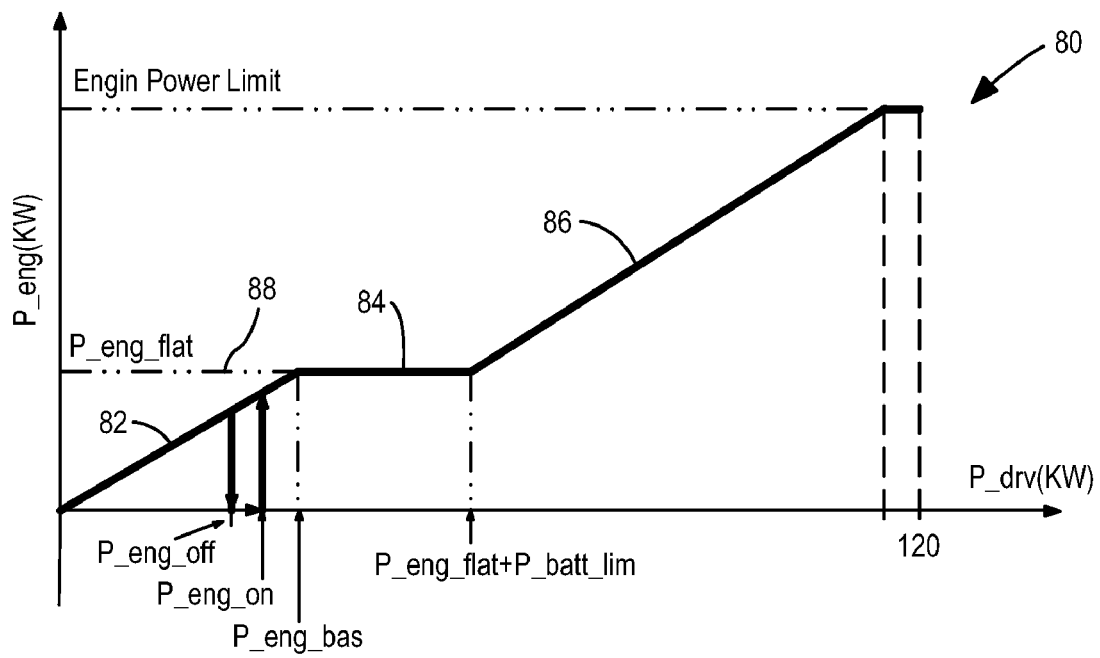
FIG. 3 illustrates a plot of driver power demand versus engine power for a plug-in hybrid electric vehicle (PHEV) operating according to a fast battery charge depletion energy management strategy.

Referring now to FIG. 3, a plot 80 of driver power demand versus engine power for a PHEV operating according to the fast battery charge depletion energy management strategy is shown. The fast depletion strategy employs the base battery power biasing rule as indicated in FIG. 3 for fast depletion of electric energy of the battery. For a power-split PHEV, when engine-on operation is necessary, the fast depletion strategy biases the usage of the battery to supply the propulsion power while maintaining the engine-on operation. For example, the fast depletion strategy allocates all the demanded drive power beyond a predefined low necessary engine power level to the battery up to the battery's power limit. The battery is primarily used for propulsion in the CD range as the engine power is kept at its lowest possible level. As a result, the fast depletion strategy achieves the battery electric energy depletion objective, and thus a fuel economy improvement without additional vehicle usage information.

Based on the fast depletion strategy, minimal fuel consumption can be achieved if the total trip distance traveled before the next battery charge is less than or equal to the base CD range. The total estimated travel distance between two consecutive battery charge events is called "Distance until Charge" (DUC). Given quality DUC information, the use of the battery can be better planned in the trip domain with a more optimally controlled battery charge depletion process for the following control and operational objectives: 1. fuel economy improvement; 2. battery maintenance and durability enhancement; 3. vehicle drivability and performance improvement; and 4. flexible vehicle and power usage functions. That is, the fuel economy can be optimized if the battery usage is adapted for the distance (i.e., an accurate DUC range) that the vehicle will be driven until the next charge.

When DUC information is available and the DUC range is longer than the base CD range, it is possible to adjust the battery electric power depletion rate, as will be explained with respect to FIG. 5b, to favor overall fuel economy improvement and system protection objectives. To this end, the fast depletion strategy has to be made flexible with an additional control variable to adjust the battery power biasing level.

Figure 4:
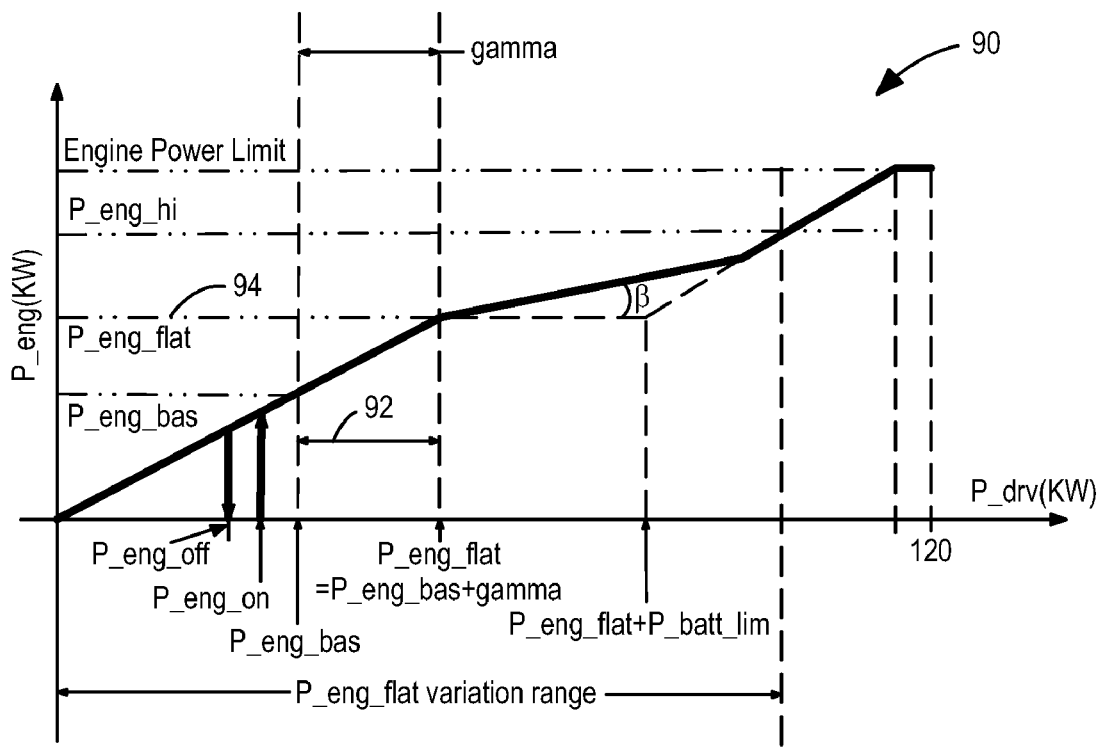
FIG. 4 illustrates a plot of driver power demand versus engine power demand for a PHEV operating according to a distance until charge (DUC) based battery charge depletion energy management strategy.

Referring now to FIG. 4, a plot 90 of driver power demand versus engine power demand for a PHEV operating according to a DUC based battery charge depletion energy management strategy is shown. As shown in FIG. 4, this strategy is made flexible with an additional control variable ("gamma") to adjust the battery power biasing level. For simplicity, only one control variable (i.e., gamma) is presented in FIG. 4. The plots of FIGS. 3 and 4 are similar with the plot of FIG. 4 having an elevated engine power within driver power demand range 92.

The design parameter $P_{eng\_bas}$ is the minimum engine power request that is used in the base CD power biasing rule as indicated in FIG. 3. The design parameter $P_{eng\_flat}$ ($P_{eng\_flat} = P_{eng\_bas} + $ gamma) is the minimum engine power request that is used in the DUC oriented base CD power biasing rule as indicated in FIG. 4.

As indicated in FIG. 3, when the engine is on, the engine power supplies all the driver power request if $P_{eng\_bas} > P_{drv}$ as indicated at level 82, and the engine power will stay at $P_{eng\_bas}$ if $P_{eng\_bas} < P_{drv} < P_{eng\_bas} + P_{batt\_lim}$ as indicated at level 84 until the drive power request $P_{drv}$ exceeds $P_{eng\_bas} + P_{batt\_lim}$ as indicated at level 86. Within $P_{eng\_bas} + P_{batt\_lim}$ indicated at level 84, the driver power demand beyond $P_{eng\_bas}$ is allocated to the battery up to the battery discharge power limit $P_{batt\_lim}$.

In the DUC based depletion strategy, a power offset parameter γ is added to reshape the power biasing curve as indicated in FIG. 4. The design parameter γ ($-P_{eng\_bas} \leq \gamma \leq (P_{eng\_hi} - P_{eng\_bas})$) determines the power biasing level and the battery charge depletion rate such that some of the battery electric energy can be saved for drive power assistance. It also provides space to elevate engine operating efficiency.

After the engine is started, the engine is responsible for delivering the entire driver power request if driver power request (P_drv) is less than the P_eng_flat level 88 and 94, respectively, in FIGS. 3 and 4. In the range in which P_drv is less than the base engine power P_eng_bas level (e.g., level 82 shown in FIG. 3), the engine operation in such a low torque region is relatively very inefficient. Such a design basically attempts to minimize the fuel consumption while there is sufficient battery electric energy conservation without considering the overall system operation efficiency throughout the driving cycle, especially when the DUC range is longer than the base CD range.

From the trip domain point of view, it is possible to improve the overall system operation efficiency by elevating the engine power when it is very low and the engine is inefficient. The amount of extra engine power is buffered electrically in the battery to be used for vehicle propulsion through trip domain redistribution in a more efficient manner. The ability of such an engine power elevation and trip domain redistribution is mainly limited by the driving cycle information. When there is no DUC information available, or the PHEV is operating in charge sustaining (CS) mode, the level of engine power elevation has to be conservative to avoid unnecessary fuel energy consumption. However, it is still expected that an engine power elevation strategy described herein will improve the overall fuel economy with more aggressive battery buffering action. When DUC information is available, the depletion of the battery before the end of the DUC range can be guaranteed with the DUC based depletion strategy. In this case, more and higher magnitude engine power elevation can be applied to execute active battery charge from fuel energy and energy buffering and redistribution in the trip domain.

As indicated above, energy management strategies in accordance with embodiments of the present invention take advantage of the PHEV large battery to carry out active and aggressive fuel energy buffering such that the fuel energy can be transferred into mechanical work in a more efficient manner in time domain or trip domain redistribution. The energy management strategies apply more and higher magnitude engine power elevation in order to execute active battery charge from fuel energy and energy buffering and redistribution in the trip domain. To this end, the energy management strategies solve the inefficient engine low power operation problem by elevating the engine operating point to a higher power output state without violation of the PHEV energy management objectives and system protection requirements.

Figure 5A:
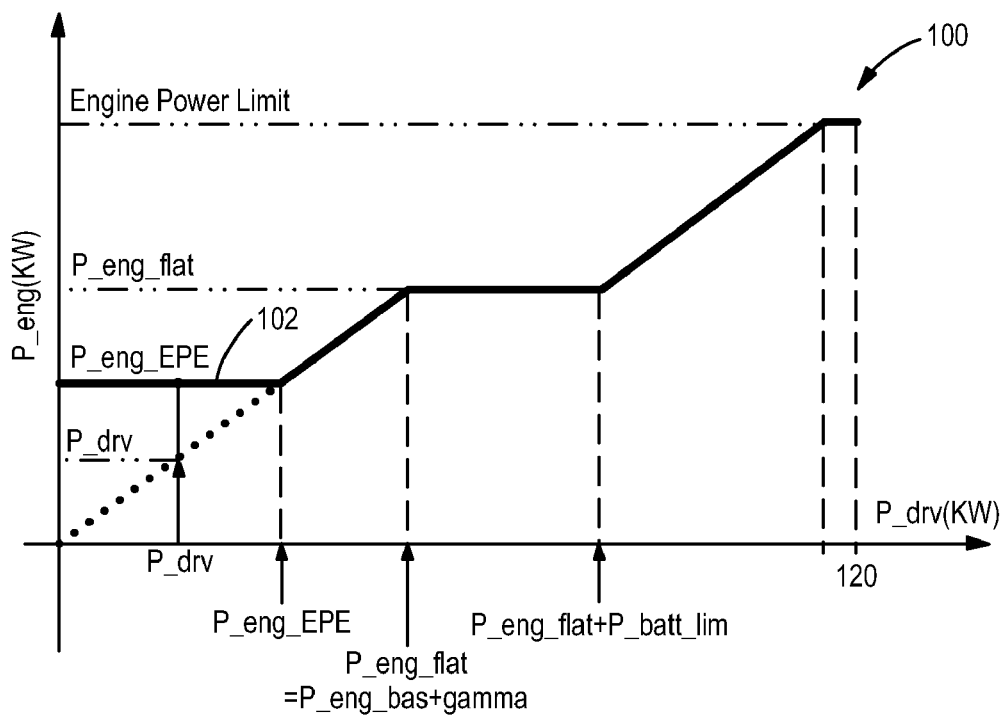
FIG. 5a illustrates a plot of driver power demand versus engine power demand for a PHEV operating according to an engine power elevation (EPE) battery energy management strategy in accordance with an embodiment of the present invention.

Referring now to FIG. 5a, a plot 100 of driver power demand versus engine power demand for a PHEV operating according to an engine power elevation (EPE) battery energy management strategy in accordance with an embodiment of the present invention is shown. Given the large PHEV battery capacity, the EPE strategy elevates the engine power when the current drive power request is very low as indicated at level 102 such that the engine operation can be relocated to a higher efficiency operating point. The extra power is buffered by the battery electrically, and it is reapplied to vehicle propulsion through time domain redistribution. As a result, the overall time domain average PHEV operation efficiency is elevated. The control concept of the associated battery power biasing rule of the EPE strategy is illustrated in FIG. 5a. As described, the battery power biasing rule is for engine power elevation.

According to the EPE battery power biasing rule, an engine power level is determined by the EPE control system such that the engine power output is elevated to this EPE lower power boundary, called $P_{eng\_EPE}$, when the drive power request is smaller than this level. The extra power $P_{eng\_EPE} - P_{drv}$ is transferred into electrical energy and is buffered by the battery for future vehicle propulsion.

A problem to be considered is how to achieve a higher average efficiency by engine power elevation and trip domain energy redistribution. This concept can be further explained by the following mathematical demonstration (for simplicity, the power loss will be ignored in the derivation). Assume $t_1$ and $t_2$ are two time instants along the time domain and $t_1 < t_2$. At $t_1$, the drive power request is $P_{t1}$ and $P_{t1}$ is small and the engine efficiency at this power level is $\eta_1$, which is also at very low value. Assume at time instant $t_2$ a portion of the drive power request is $P'_{t2}$, which can be generated at a much higher efficiency $\eta_2$, $\eta_2 \gg \eta_1$. The time domain average engine power efficiency can be calculated using the following equation:

$$\eta_{tda}^b = \frac{P_v^b}{P_e^b} = \frac{P_{t1} + P'_{t2}}{\frac{P_{t1}}{\eta_1} + \frac{P'_{t2}}{\eta_2}} \quad (1)$$

On the other hand, if by elevating the engine power to $P_{t1}+P_{t2}$ with power efficiency $\eta_2$ at time instant $t_1$ and by reapplying the power $P'_{t2}$ at time instant $t_2$ electrically, the time domain average engine power efficiency is calculated as:

$$\eta_{tda}^a = \frac{P_v^a}{P_e^a} = \frac{P_{t1} + P'_{t2}}{\frac{P_{t1} + P_{t2}}{\eta_2}} = \frac{P_{t1} + P_{t2} \cdot \eta_{elec}}{\frac{P_{t1} + P_{t2}}{\eta_2}} \quad (2)$$

Where $P'_{t2} = P_{t2} \cdot \eta_{elec}$ and $\eta_{elec}$ is the average electric path power efficiency by lumping together the battery charge, discharge, and electric machine efficiencies. $P_{t2}$ is the extra power that is generated by the engine at $t_1$, and it actively charges the battery. If $P_{t2} = \kappa P_{t1}$, it would be expected that $\eta_{tda}^a \geq \eta_{tda}^b$ such that the engine overall operation efficiency is boosted by the time domain power redistribution strategy. To this end, it is easy to obtain the following relationship:

$$0 \leq \kappa \leq \frac{\frac{\eta_2}{\eta_1} - 1}{1 - \eta_{elec}} \quad (3)$$

In this equation, $\eta_2$ is dependent on $\kappa$. In application, the engine power elevation level $P_{t2}$ has to be regressively programmed at each input set-point $P_{drv} = P_{t1}$ and engine state based on a static efficiency analysis and vehicle calibration tests such that the condition expressed in equation (3) is satisfied and $P_{eng\_EPE} = (1+\kappa)P_{t1}$. The programming result will be summarized into lookup tables for in-vehicle control implementation. From the calibration, an EPE engine power upper bound $\hat{P}_{t2}$ and low bound $\check{P}_{t2}$, will be determined with respect to $P_{t1}$ and engine speed set-point.

Figure 6:
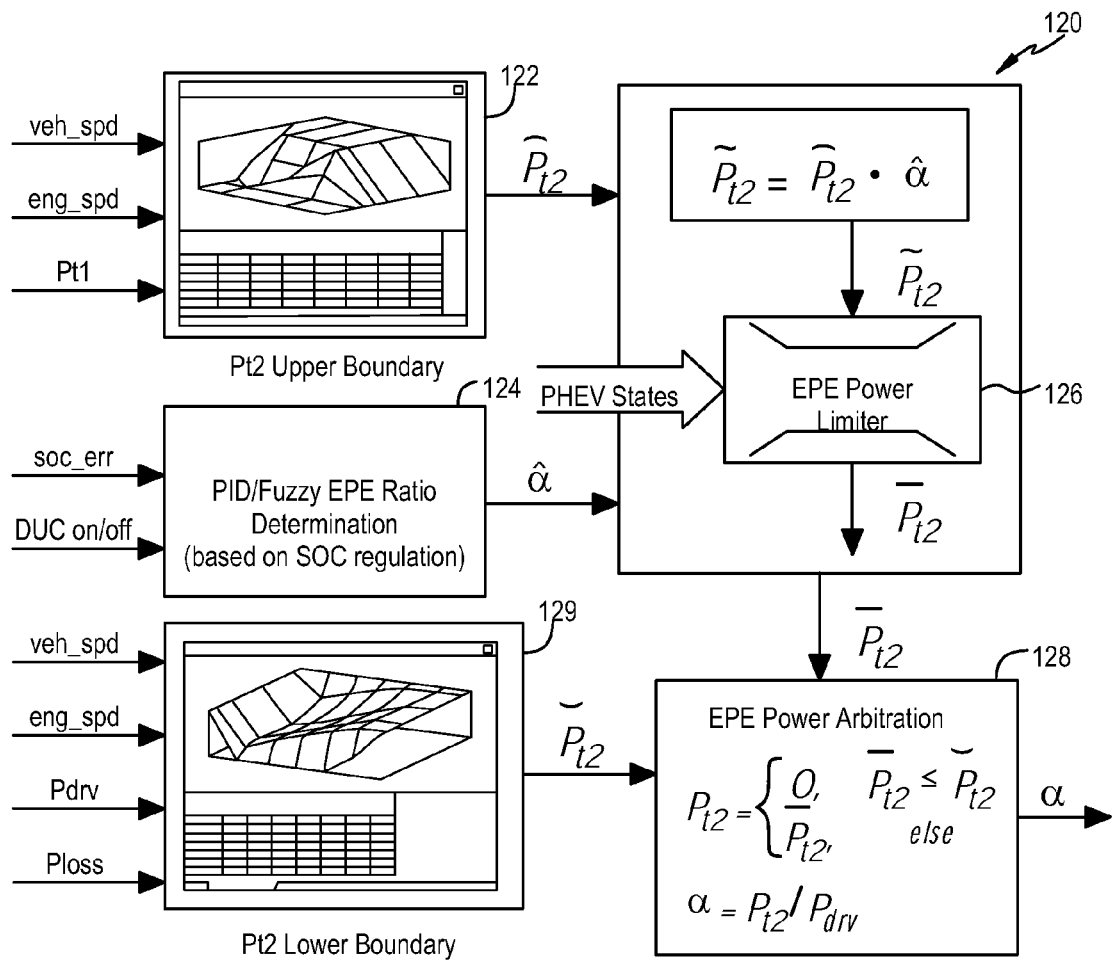
FIG. 6 illustrates a block diagram of a control system for implementing the EPE battery energy management strategy.

Referring now to FIG. 6, with continual reference to FIG. 5a, a block diagram of a control system 120 for implementing the EPE battery energy management strategy is shown. The EPE control provides engine power elevation ratio determination.

The EPE control first determines a candidate engine power elevation offset $\hat{P}_{t2}$ with respect to the current drive power request $P_{drv} = P_{t1}$ from the EPE upper bound calibration map and vehicle states unit 122, as shown in FIG. 6. Meanwhile, a raw engine elevation ratio $\hat{\alpha}$ is provided by the EPE ratio determination unit 124 via a feedback battery SOC controller 124 that regulates the battery SOC with respect to the reference battery SOC set-point. The reference SOC set-point is obtained from the battery charge depletion profile when the PHEV is in charge depletion (CD) mode and it is equal to the battery charge sustaining (CS) level when the PHEV is in CS mode. The control variable $\hat{\alpha}$ indicates whether the EPE control is needed and to what extent it is needed with consideration on the trip/driving cycle domain optimization objective.

Next, an EPE power limiter 126 limits the active battery charge power from EPE by a EPE battery active charge limit determined from PHEV states, such as battery SOC, temperature, battery charge limit, power loss, power-train operation state, etc. After that, a candidate EPE power $\overline{P}_{t2}$ is generated. The final EPE power is determined by EPE power arbitration unit 128. If $\overline{P}_{t2}$ is less than the lower bound of the calibrated EPE power $\check{P}_{t2}$ provided by the lower bound calibration map and vehicle states unit 129, then no engine power elevation is executed. If $\overline{P}_{t2}$ is larger than $\check{P}_{t2}$ then the final EPE power level is $P_{t2} = \overline{P}_{t2}$ and an EPE power offset ratio $\alpha$ is generated as shown in FIG. 6. The EPE power offset ratio $\alpha$ indicates the system allowable engine power elevation and active battery charge power level. Given $P_{drv} = P_{t1}$ and $P_{drv} < P_{eng\_flat}$, the final engine power command is $P_{eng} = P_{eng\_EPE} = (1+\alpha)P_{t1}$.

Remaining on FIG. 6, and with the preceding description thereof in mind, the following further details regarding the processes employed by the control system for implementing the EPE battery energy management strategy are provided. Generally, when the EPE is active, the control system first checks whether the DUC value, and thus a battery SOC depletion profile, are available. If not available, a constant value of $\alpha$ obtained from calibration is used. When the SOC profile is available, it provides a reference SOC set-point in the trip domain to the control strategy. By comparing the current battery SOC level to that reference set-point, the control system knows the PHEV is consuming more or less electricity than expected (dictated by the SOC profile in the spatial domain). For example, if the PHEV battery SOC is less than the reference SOC set-point, then this indicates more electricity is consumed than planned. The value of $\alpha$ is increased to allow higher level of engine power elevation. Consequently, the battery is charged from the fuel energy more to balance the battery SOC conservation. On the other hand, the value of $\alpha$ is decreased to reduce active charge to the battery from the fuel energy to facilitate battery depletion when the battery SOC is higher than desired level. The value of $\alpha$ indicates the control system's preference on actively charging the battery from fuel energy by applying the EPE rule. This is only the first part of the overall strategy and the value of $\alpha$ determined from the SOC feedback controller is only a raw value, denoted by $\hat{\alpha}$. This is not the final value of $\alpha$ that will be used in the PHEV energy management controller.

At each time instant, EPE upper and lower bounds have to be determined from offline optimally calibrated tables with respect to instantaneous vehicle states such as drive power demand, engine speed, vehicle speed, temperature, etc. The intermediate EPE level is calculated by multiplying the previous obtained $\hat{\alpha}$ to the upper bound. The intermediate engine power elevation level is further clipped by the EPE power limits that are determined by power-train system constraints, battery power limits, electronic power limits and power losses. After this, the EPE level is finalized by dividing the clipped intermediate EPE power level to the total drive power demand. This final $\alpha$ is used in the PHEV energy management control to consequently compute the real engine power request.

The commanded engine power is computed based on the drive power demand and the elevation ratio, α. The elevated new engine power brings the engine operating efficiency to a higher level in comparison to the engine efficiency level when the engine only delivers the driver commanded power. The overall system is expected to operate in a higher efficiency manner in average in a long run with improved fuel economy even though the instantaneous fuel consumption at the engine power elevation moment is increased. All these are achieved by more aggressively utilizing the energy buffering capability of the battery.

Figure 5B:
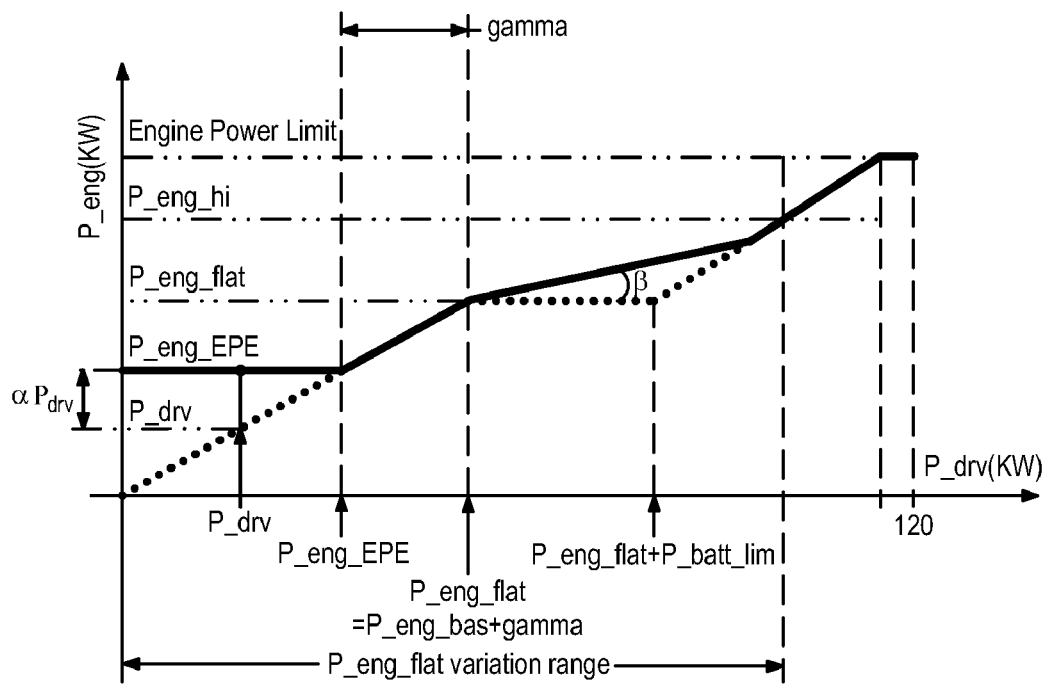
FIG. 5b illustrates a plot of driver power demand versus engine power demand for a PHEV operating according to an enhanced version of the EPE battery energy management strategy.

FIG. 5b illustrates a plot 100 indicative of an enhanced version of the battery power biasing rule. A new variable is added to provide variations in the shape of the battery power biasing rule. The added variable β (also shown in FIG. 4) adjusts the relative engine power increasing rate with respect to the increasingly higher drive power demand at the wheel which the enhanced battery power biasing rule can also be realized using a lookup table as shown in FIG. 6.

Through the EPE ratio determination control unit 124, the EPE control is connected in closed-loop to the battery SOC regulation algorithm. Based on the battery SOC error and the SOC regulation upper bound, the level of expected and permitted engine power ratio α is obtained.

Figure 10:
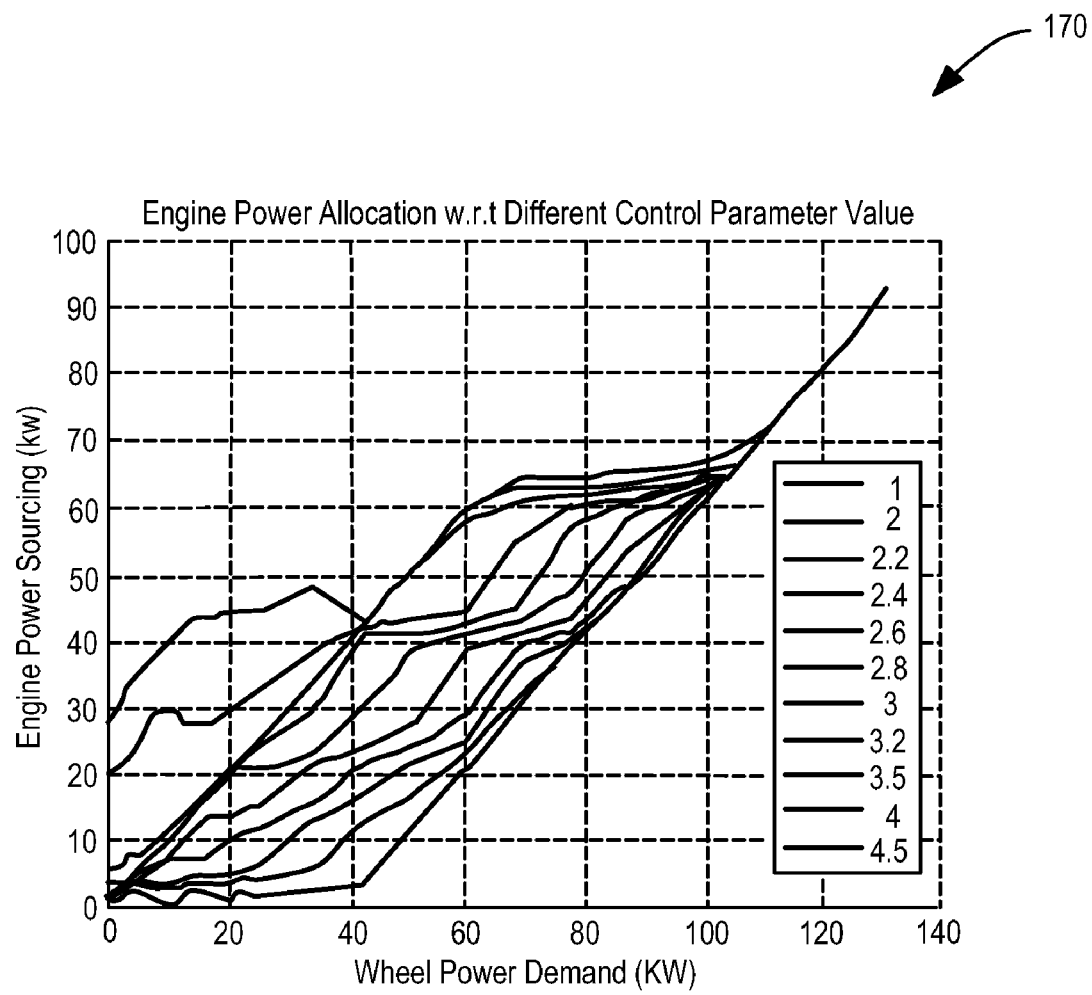
FIG. 10 illustrates a plot of wheel power demand versus engine power allocation with different values of a control parameter, the spatial domain fuel to electricity consumption ratio.

A SOC charge depletion profile (e.g., depletion profile unit 142 shown in FIG. 8) depicts the expected battery electric energy consumption process with respect to travel distance. It serves as a reference to the energy management strategy such that the PHEV battery SOC is regulated around this reference level. This profile can be the basic fast battery charge depletion trajectory as shown in FIG. 10 or it can be any variable battery charge depletion trace when the DUC information is available. The EPE battery active charge control energy management strategy is mainly used when the battery SOC is less than the reference SOC set-point, where the active battery charge is allowed (and preferred).

Figure 7:
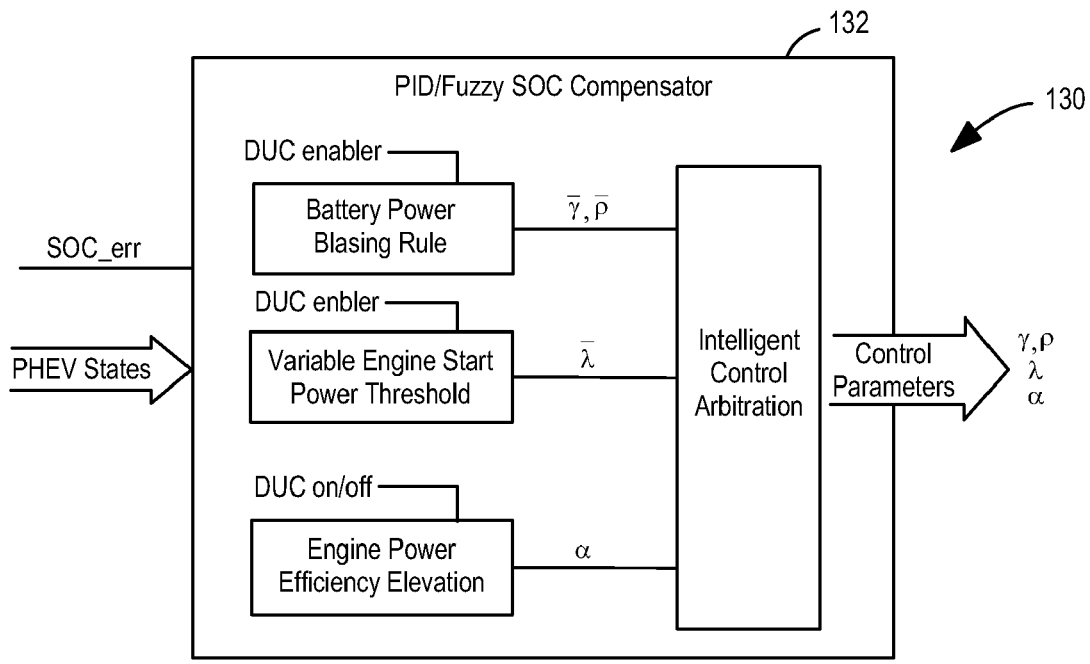
FIG. 7 illustrates a block diagram of a control system for implementing a DUC based battery charge depletion energy management strategy in accordance with an embodiment of the present invention.

Referring now to FIG. 7, a block diagram of a control system 130 of a distance until charge (DUC) based battery charge depletion energy management strategy in accordance with an embodiment of the present invention is shown. The block diagram of FIG. 7 shows the EPE and DUC control arbitration structure 132 for this DUC based battery charge depletion control strategy. When DUC control is enabled, such a system candidate EPE power ratio α̂ has to be further arbitrated with other DUC control variables γ, ρ, λ, to optimize the expected average PHEV operation efficiency in the trip domain, as shown in FIG. 7.

Figure 8:
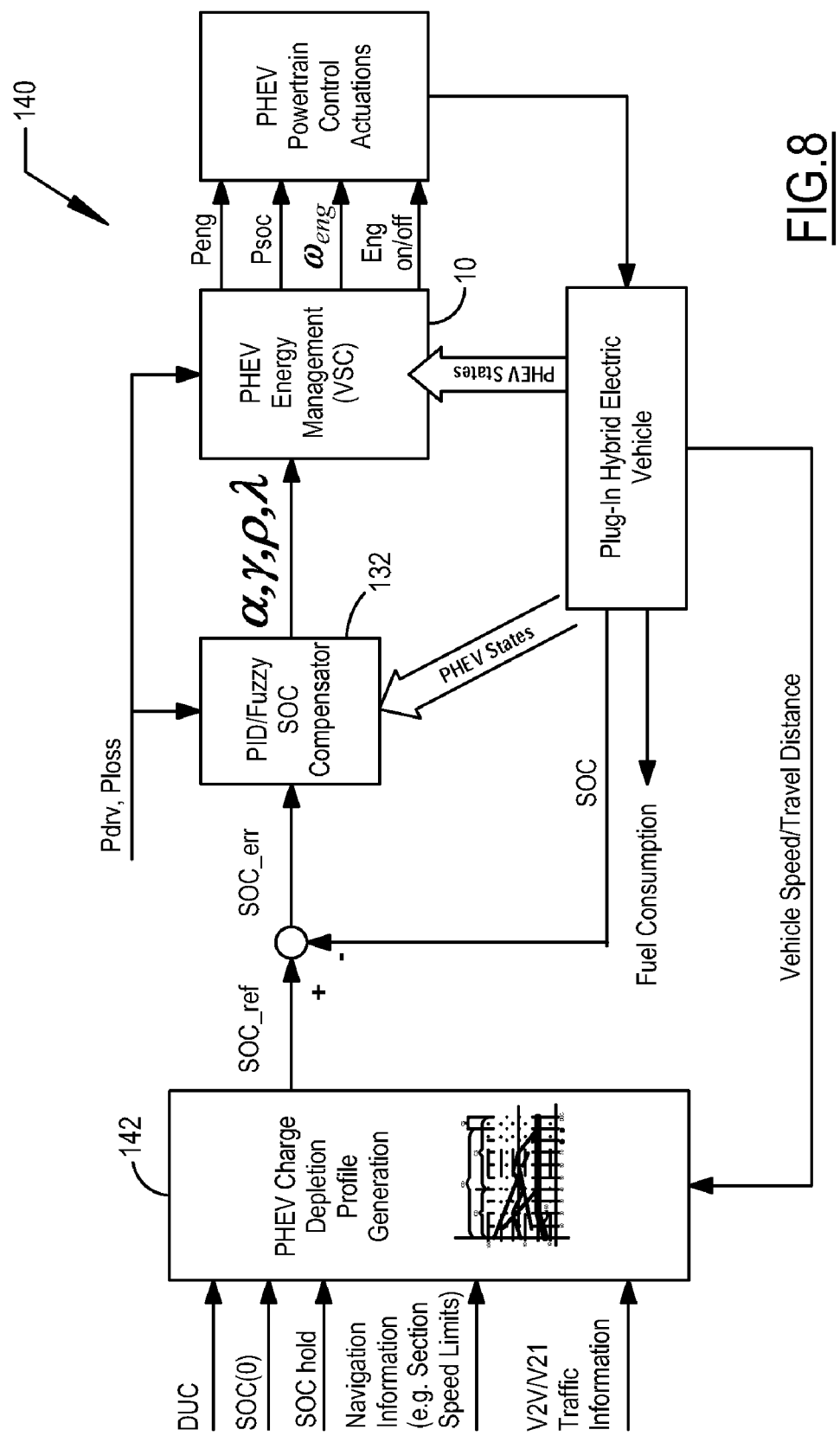
FIG. 8 illustrates a block diagram of the complete control system for implementing the DUC based battery charge depletion energy management strategy.

Referring now to FIG. 8, with continual reference to FIG. 7, a block diagram of the complete control structure 140 of the DUC based battery charge depletion energy management strategy is shown. The block diagram of FIG. 8 shows the closed-loop battery active charge and charge depletion control strategy.

Given the reference battery charge depletion profile from depletion profile unit 142, the SOC tracking error based feedback control (e.g., PID and Fuzzy logic) compensator 132 adjusts the battery power biasing control parameters γ, ρ, and α, as well as the engine start/stop interpolation parameter λ such that the PHEV battery SOC is regulated around the reference SOC set-point during the vehicle operation in DUC range. These control parameters determine the extent to which the fast battery depletion can be released such that more battery electric energy can be saved for future power assistance purposes. After that, the PHEV energy management strategy makes a decision on the engine stop/start state and the power split ratio between the engine power and the battery electric power, together with an optimal engine speed set-point. The battery electric energy is controlled so that it is depleted close to the end of the DUC range while the liberated electric energy is used to elevate the overall system operation efficiency throughout the travel distance. As a result, the PHEV energy utilization efficiency is improved both in the vehicle domain and in the trip domain such that a better overall fuel economy is achieved.

Figure 9:
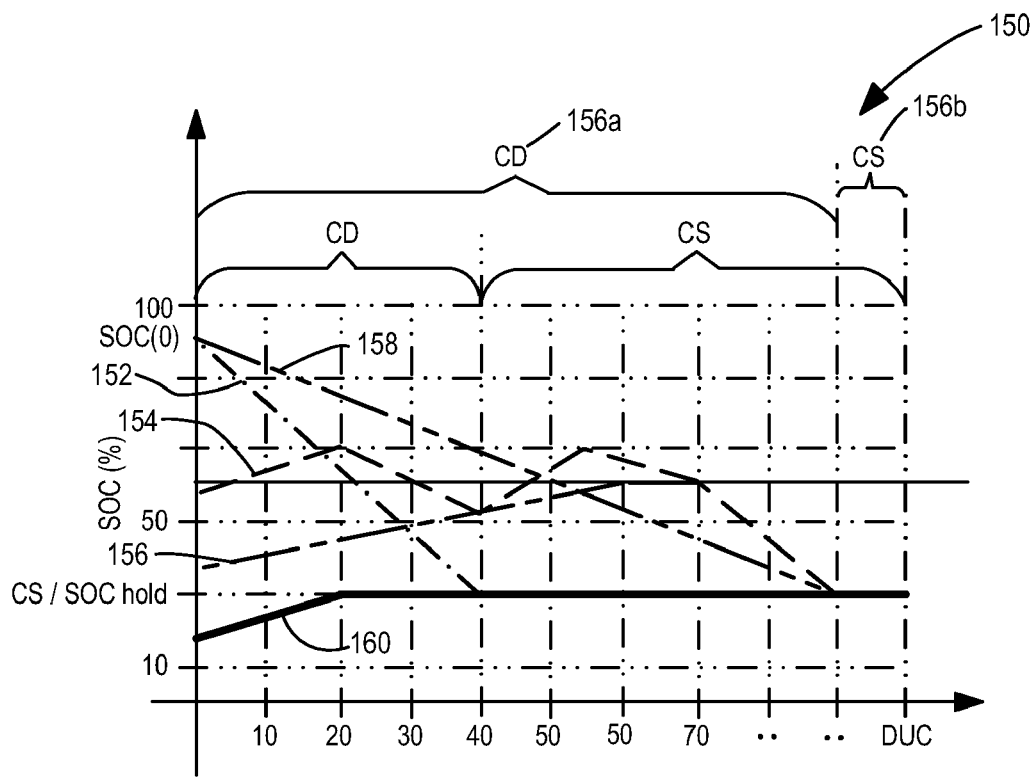
FIG. 9 illustrates a plot of variable battery charge depletion profiles enabled by the EPE battery energy management strategy in accordance with an embodiment of the present invention.

Referring now to FIG. 9, a plot 150 of variable battery charge depletion profiles enabled by the EPE control strategy in accordance with an embodiment of the present invention is shown. By applying the EPE active battery charge control algorithm, the DUC based battery charge depletion control strategy has more options to use the available battery capacity with a charge depletion profile other than the monotonous depletion patterns shown in FIG. 9. It is possible to actively charge the battery based on a more aggressive energy management and optimization strategy and on battery protection purpose.

Trace 152 represents the fast charge depletion profile.

Trace 154 represents a battery charge oscillation process, which can be planned in a DUC based battery charge depletion profile. When the drive power request is low in a certain section along the DUC range, the engine can be elevated to deliver more power and actively charge the battery with a higher operating efficiency. By doing this, more electrical energy is available when the drive power request is high and more power assistance is necessary to keep the engine operation within a high efficiency steady state.

Trace 156 represents a battery protection CD profile. The battery protection profile is useful for battery protection purposes. In this DUC driving cycle, the battery is continuously charged by the fuel energy to a level that is optimal for battery operation (CD range 156a). The battery starts charge sustaining (CS) control after that level is reached. At the final section of the DUC range (CS range 156b), the battery depletion starts and the vehicle is almost running in electric vehicle (EV) mode until the end of the trip. Trace 158 represents a trip averaging CD profile.

The EPE control concept also enables some optional features. For example, when the battery SOC hold function is enabled and the driver chooses to reserve a certain level of battery electric energy for utility purpose other than vehicle propulsion, an active battery charge CD profile represented by trace 160 can be used and the PHEV actively charges the battery from the fuel energy through the EPE control method until the desired SOC conservative level is reached before reaching the trip destination.

Referring back to FIG. 8, a battery charge depletion profile is generated starting at the initial SOC point and zero distance, and it ends at the targeting battery SOC level at the destination of the trip, usually a charge station for battery recharge. The SOC profile between the starting and the ending point is shaped based on real time traffic information, future traffic and driving pattern prediction along the route, navigation information, transportation regulation information, trip information (route and distance and timing schedule, etc.), vehicle states (battery SOC, fuel level, temperature) and driver selected operating objective (fuel economy vs. performance vs. longest distance, etc.).

The general idea is to regulate the battery SOC level with respect to the reference battery charge depletion profile such that the real time battery SOC is kept within the vicinity around the reference set-point from the profile along the trip. In order to realize this, a PID and/or Fuzzy Logic type of controller 132 is implemented to compensate for the error between the real time battery SOC and the reference SOC by adjusting the parameters that direct the relative battery power consumption rate and the fuel consumption rate. This is achieved by determining proper power demand partitioning/distribution to the electric power unit and the engine.

The control parameters $\alpha$, $\gamma$, $\rho$, and $\lambda$ in FIG. 8 are thus optimized to achieve that objective. Consequently, the engine operation state, the engine power command, and the battery power command can be determined based on the optimized selection of $\alpha$, $\gamma$, $\rho$, and $\lambda$. So are the power-train operating states such as engine speed, generator speed, engine torque and motor torque, etc. After being commanded, a certain amount of electric power is consumed. In this loop, the varying drive power demand from the driver and the system losses (mechanical, electrical and extra loads) are viewed as disturbances. Because of them, the resulting battery SOC level will not be as expected when generating control commands. This error feeds back to compensator 132 for the compensator to generate a new set of optimized control commands in the next cycle.

The control algorithm, currently using PID and Fuzzy Logic based strategy, does not exclude other types of control methods if their control effect causes the real time battery SOC to converge to the reference SOC set-point.

Referring now to FIG. 10, a plot 170 of wheel power demand versus engine power allocation with different control parameter values is shown. In FIG. 10, each trace represents an engine power vs. wheel power demand rule with respect to different control parameter values shown in the legend in FIG. 10. (In FIG. 10, the trace where the engine power sourcing is roughly 30 kW at zero wheel power demand is for the control parameter value equal to 1.0, the trace where the engine power sourcing is roughly 20 kW at zero wheel power demand is for the control parameter equal to 2.0, and so on.) Such control parameters are not directly related to the $\alpha$, $\gamma$, $\rho$, and $\lambda$ parameters proposed in the control strategy. It could be any determination factor; e.g. a price trade of value between electricity and fuel.

In summary, the foregoing describes PHEV energy management strategies which elevate engine power to a higher efficiency level through trip domain redistribution by taking advantage of the available PHEV large battery capacity for energy buffering. The energy management strategies are to improve overall PHEV fuel economy, especially when distance until charge (DUC) information is available. The energy management strategies also make possible the use of several battery charge depletion profiles for optimized charge depletion.

Features of the energy management strategies described herein include engine power elevation and active battery charge control, the engine power elevation (EPE) biasing rule, the closed loop EPE strategy with active battery charge and depletion control, and the control algorithms and structures of the DUC based battery charge depletion control that incorporates the EPE control strategy.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for a vehicle having an engine and a battery configured to respectively deliver engine power and battery power to provide a total output power for powering the vehicle, wherein engine power up to a threshold amount without battery power may be delivered in an initial total output power range and at least the threshold amount of engine power with battery power may be delivered in the remaining total output power range, the method comprising:
   in response to a driver demand power in which the sum of the magnitudes of the driver demand power and vehicle powering losses falls within the initial total output power range, obtaining a state-of-charge (SOC) set-point of the battery from a battery charge depletion profile indicative of expected battery power consumption with respect to travel distance of the vehicle and generating an elevated engine power that is greater than the sum of the magnitudes of the driver demand power and vehicle powering losses, is less than the threshold amount of engine power, and is a function of a difference between the SOC of the battery and the SOC set-point at the time of the driver demand power; and
   controlling the engine to deliver the elevated engine power in response to the driver demand power.

2. The method of claim 1 further comprising:
   transferring from the engine to the battery the extra power between the elevated engine power and the sum of the magnitudes of the driver demand power and the vehicle powering losses for the battery to buffer for future battery power delivery.

3. The method of claim 2 wherein:
   the extra power is transferred from the engine to the battery at a rate dependent on the state-of-charge of the battery.

4. The method of claim 2 wherein:
   the transferring is based on the battery charge depletion profile.

5. The method of claim 1 wherein:
   the elevated engine power is higher when the state-of-charge of the battery is less than the SOC set-point than when the SOC of the battery is greater than the SOC set-point.

6. The method of claim 1 wherein:
   the elevated engine power is generated as a function of the battery charge depletion profile and distance until charge information.

7. The method of claim 1 further comprising:
   receiving a driver power command indicative of the driver demand power.

8. The method of claim 7 wherein:
   the engine is controlled to deliver the elevated engine power while the driver demand power is less than the elevated engine power in response to receiving the driver power command while the engine is turned on.

9. The method of claim 1 wherein:
   the driver demand power is indicative of driver demand power for vehicle propulsion.

10. The method of claim 1 wherein:
    the vehicle is a plug-in hybrid electric vehicle.

11. A system for a vehicle having an engine and a battery configured to respectively deliver engine power and battery power to provide a total output power for powering the vehicle, wherein engine power up to a threshold amount without battery power may be delivered in an initial total output power range and at least the threshold amount of engine power with battery power may be delivered in the remaining total output power range, the system comprising:
    a controller configured to in response to a driver demand power in which the sum of the magnitudes of the driver demand power and vehicle powering losses falls within the initial total output power range, obtain a state-of-charge (SOC) set-point of the battery from a battery charge depletion profile indicative of expected battery power consumption with respect to travel distance of the vehicle and generate an elevated engine power that is greater than the sum of the magnitudes of the driver demand power and vehicle powering losses, is less than the threshold amount of engine power, and is a function of a difference between the SOC of the battery and the SOC set-point at the time of the driver demand power, the controller further configured to control the engine to deliver the elevated engine power in response to the driver demand power.

12. The system of claim 11 wherein:
the controller is further configured to transfer from the engine to the battery the extra power between the elevated engine power and the sum of the magnitudes of the driver demand power and the vehicle powering losses for the battery to buffer for future battery power delivery.

13. The system of claim 12 wherein:
the controller is further configured to transfer from the engine to the battery the extra power based on the battery charge depletion profile.

14. The system of claim 11 wherein:
the controller is further configured to generate the elevated engine power as a function of distance until charge information.

15. The system of claim 11 wherein:
the controller is further configured to receive a driver power command indicative of the driver demand power, wherein the controller is further configured to control the engine deliver the elevated engine power while the driver demand power is less than the elevated engine power in response to receiving the driver power command while the engine is turned on.

16. The system of claim 11 wherein:
the vehicle is a plug-in hybrid electric vehicle.

17. The system of claim 11 wherein:
the elevated engine power is greater when the state-of-charge of the battery is less than the SOC set-point than when the SOC of the battery is greater than the SOC set-point.

* * * * *